(12) United States Patent
Alattar

(10) Patent No.: US 6,959,098 B1
(45) Date of Patent: Oct. 25, 2005

(54) METHOD AND SYSTEM FOR DETERMINING IMAGE TRANSFORMATION

(75) Inventor: Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 09/452,022

(22) Filed: Nov. 30, 1999

(51) Int. Cl.$^7$ .............................................. G06K 9/00
(52) U.S. Cl. ..................................................... 382/100
(58) Field of Search .............................. 382/100, 276, 382/286–289, 291, 293, 254, 266, 275, 294, 290, 168; 388/168

(56) References Cited

U.S. PATENT DOCUMENTS

| | | | |
|---|---|---|---|
| 4,701,805 A | * | 10/1987 | Maeshima ................. 358/3.21 |
| 4,908,873 A | | 3/1990 | Philibert et al. |
| 5,216,724 A | * | 6/1993 | Suzuki et al. ............... 382/135 |
| 5,481,377 A | | 1/1996 | Udagawa et al. |
| 5,537,223 A | | 7/1996 | Curry |
| 5,668,898 A | * | 9/1997 | Tatsuta ....................... 382/290 |
| 5,751,854 A | | 5/1998 | Saitoh et al. |
| 5,799,111 A | | 8/1998 | Guissin |
| 5,822,436 A | * | 10/1998 | Rhoads ........................ 380/54 |
| 5,862,260 A | | 1/1999 | Rhoads |
| 5,949,055 A | | 9/1999 | Fleet et al. |
| 6,086,706 A | | 7/2000 | Brassil et al. |
| 6,154,571 A | * | 11/2000 | Cox et al. .................... 382/250 |
| 6,181,813 B1 | | 1/2001 | Fan et al. |
| 6,285,776 B1 | | 9/2001 | Rhoads |
| 6,307,949 B1 | | 10/2001 | Rhoads |
| 6,408,082 B1 | | 6/2002 | Rhoads et al. |
| 6,411,392 B1 | | 6/2002 | Bender et al. |
| 6,456,727 B1 | * | 9/2002 | Echizen et al. ............. 382/100 |
| 6,542,629 B1 | | 4/2003 | Wu et al. |
| 6,571,021 B1 | * | 5/2003 | Braudaway ................. 382/275 |

FOREIGN PATENT DOCUMENTS

EP          0905967          3/1999

OTHER PUBLICATIONS

O'Ruanaidh, "Rotation, Scale and Translation Invariant Digital Image Watermarking," Int. Conf. On Image Proc., Oct. 1997, IEEE, pp. 536–539.

* cited by examiner

*Primary Examiner*—Leo Boudreau
*Assistant Examiner*—Tom Y. Lu
(74) *Attorney, Agent, or Firm*—Digimarc Corporation

(57) ABSTRACT

A watermark decoding method makes use of a line-finding algorithm (e.g., the Radon transform) to determine rotation of an image from an initial orientation. Once rotation has been characterized, differential scaling of the image can readily be determined.

6 Claims, 5 Drawing Sheets

+ Impulses after original encoding
o Impulses after differential scaling

+ Impulses after counter-rotation

METHOD AND SYSTEM FOR DETERMINING IMAGE TRANSFORMATION

FIELD OF THE INVENTION

The present invention relates to image processing, and more particularly relates to technologies useful in determining the offset, rotation, scale, and differential scale of an image from a reference state.

BACKGROUND AND SUMMARY OF THE INVENTION

In many applications, it is necessary to discern the transformation of an input image from an original state. This is the case, for example, in decoding certain digital watermarks.

If the original image is available, certain image features in the original image can be matched with corresponding features in the input image so as to discern any intervening transformations. Such a system is shown in the present assignee's U.S. Pat. No. 5,930,377.

If the original image is not available, other techniques must be employed. In U.S. Pat. No. 5,862,260, and in copending application Ser. No. 09/452,023, filed Nov. 30, 1999 (now U.S. Pat. No. 6,408,082), the present assignee detailed a system employing a subliminal digital graticule signal, having known frequency domain characteristics, that is embedded in the original image with the watermark. On analyzing an input image, the frequency domain characteristics of the graticule signal can be detected and, through application of the Fourier-Mellin transform and generalized matching function (GMF) techniques, the offset, scale and rotation of the image can be discerned. Similar approaches were thereafter detailed by O'Ruanaidh et al in "Rotation, Scale and translation Invariant Digital Image Watermarking," Int. Conf. on Image Proc., October 1997, IEEE, pp. 536–539; "A Secure Robust Digital Image Watermark," Proc. SPIE, Vol. 3409, pp. 150–63, 1998; and laid-open application EP 905,967; and by Xerox in U.S. Pat. No. 5,949,055.

While the approach detailed in the '260 patent and its followers is satisfactory for determining offset, scale, and rotation of an input image from a reference state, it cannot discern differential scaling. Differential scaling occurs when an image is "stretched" (or shrunk) differently in the x- and y-directions, and can significantly impair (or prevent) detection of watermark data.

Differential scaling can arise in various ways. One is through deliberate image manipulation. Another is through distortion of a medium on which an image is printed (e.g., paper currency may be stretched through its handling by ATMs and other automated handling equipment). Differential scaling can also arise through scanning. Scanners typically scan documents by sampling successive rows of an image with a linear array of sensors. If the spacing between successive rows does not precisely match the spacing between adjoining sensors, the pixels are not truly square, again resulting in differential scaling.

The below-detailed technology addresses certain of the above-noted shortcomings. For example, some embodiments permit differential scaling to be discerned from an input image, together with offset, scale, and rotation. Other embodiments permit image rotation to be determined without reference to any embedded calibration signal.

The foregoing and additional features and advantages will be more readily apparent from the following detailed description, which proceeds with reference to the accompanying drawings.

DETAILED DESCRIPTION

The following disclosure begins by explaining how the rotation state of a document can be discerned independently of any embedded calibration data. Once rotation state is known, this disclosure teaches how embedded calibration data—if present—can then be used to determine differential scaling.

To review briefly, many watermarking techniques change the values of certain image pixels in accordance with bits of a watermarking payload. In an exemplary watermarking system, a watermark block (e.g., of 128×128 pixels) is tiled across the original image and summed to yield the encoded image. Each pixel in the block changes an associated pixel in the image up or down in value, depending on the value of a single bit in the watermark payload.

In order to read the watermark payload from an encoded image, the detector must understand the relationship between the pixels in the image and the bits of the watermark payload to which they map. To do this, it is commonly necessary to discern the geometrical transformations undergone by the image (e.g., rotation, scaling, translation, etc.). With this transform information known, the input image can be restored (e.g., remapped) back to its original state, removing these geometrical transformations. Decoding of the watermark can then proceed as if the image has not been altered. Another approach is to leave the input image in its transformed state, but to take the geometrical transformation data into account in determining how to decode the watermark payload (e.g., where in the transformed image to look for which payload bits; along which axis to look for what series of data, etc.).

Determination of Rotation

Figure 1:
FIG. 1 shows a document (a banknote) at an arbitrary rotation, theta.

FIG. 1 shows a document (here a banknote) that has been watermarked with a 48 bit payload using the summed-tiles approach outlined above. The tiled blocks were applied to the document artwork starting in the upper left-hand corner, with the top edge of the tile aligned with the top border of the artwork, and the left edge of the tile aligned with the left edge of the artwork. The other tiles are similarly oriented with respect to the artwork edges.

As shown in FIG. 1, the document may be placed on the platen of a scanner, or otherwise imaged, at a skew angle theta (the rotation angle). In order for the watermark payload to be discerned from the skewed image data, the rotation angle must be determined.

Figure 2:
FIG. 2 shows the document of FIG. 1 after scanning and edge detection.

A first step in determining the rotation angle is to perform an edge detection operation on the image data. As shown in FIG. 2, this operation proceeds by identifying steep gradients in pixel values (e.g., by determining derivatives in horizontal and vertical directions). Where the gradient exceeds a threshold value, an edge is identified. In the pixel map of FIG. 2, edges have pixel values of "1," the rest of the map has pixel values of "0."

Figure 3:
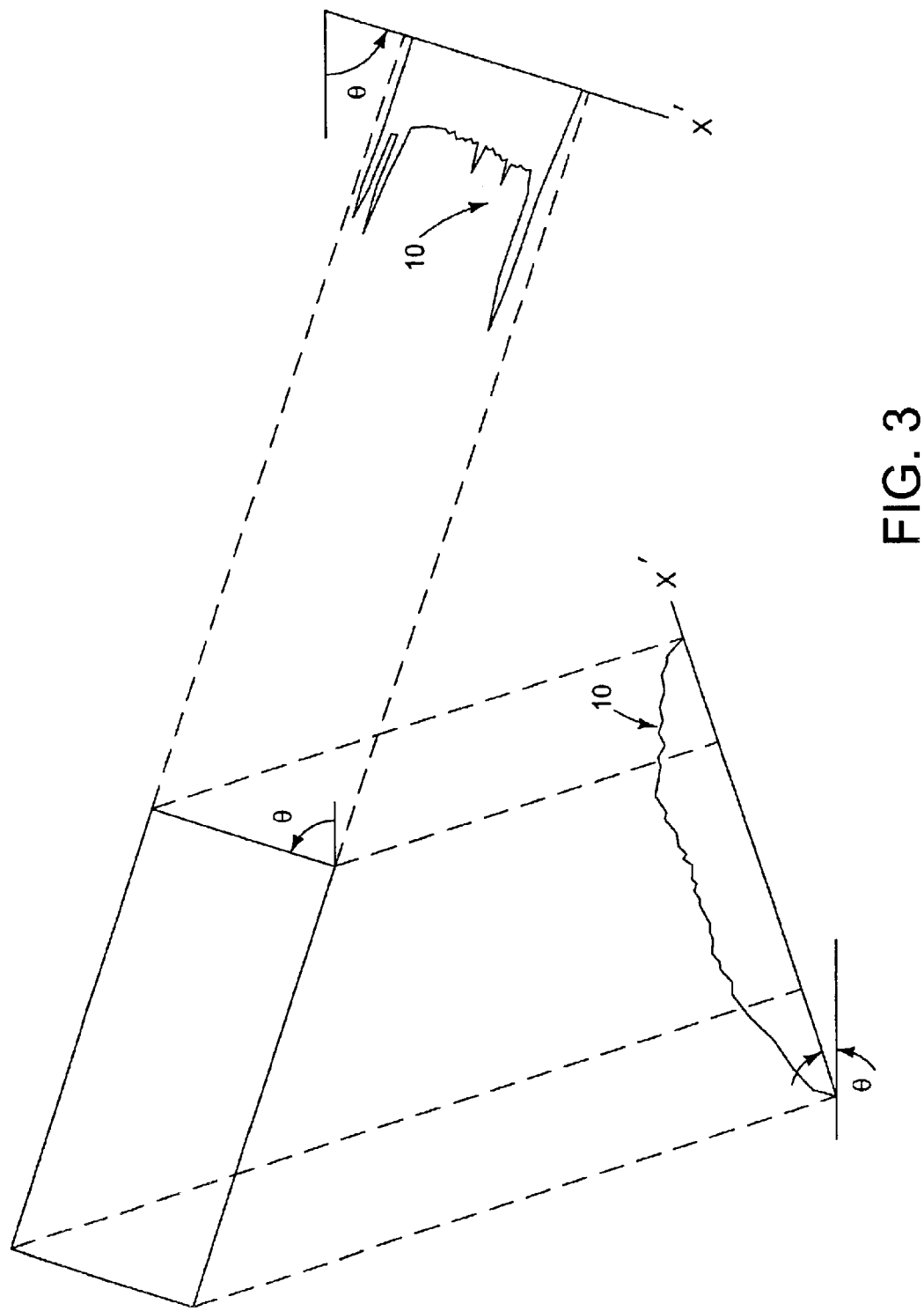
FIG. 3 is a diagram illustrating application of the Radon transform to the data of FIG. 2.

Next, a Radon transform is performed on the edge-detected map of FIG. 2. As illustrated by FIG. 3, the Radon transform computes a series of line integrals through the image at successive points along an axis x', each along a fixed angle theta through the image. (Theta defines axis x'.) The result in the illustrated case is a function 10 (commonly trapezoidal for most theta), representing the summation of values along each of several parallel lines through the image—all inclined at angle theta. The process is then repeated with an incremented angle theta. In an illustrative arrangement, theta is increased from 0 to 180 degrees. (At 180 degrees, the Radon transform output begins repeating itself, with 181 degrees being the same as 1 degree, etc.)

Figure 4:
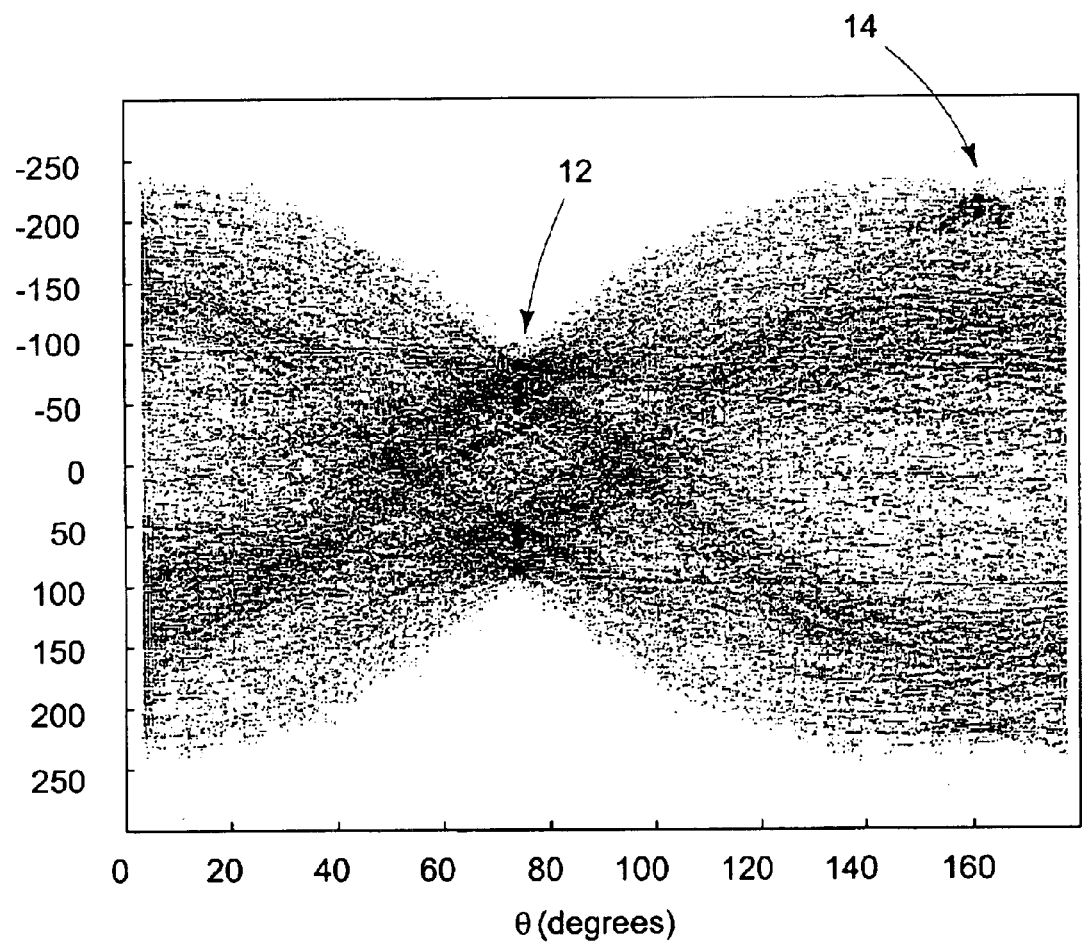
FIG. 4 is a plot showing the magnitude of the Radon transform for each of plural angles.

FIG. 4 shows the results of the Radon transforms on the edge-detected image map of FIG. 2. The Radon transform for theta=72 degrees causes the line integrals to pass along the principal edges shown in FIG. 2—those along the top and bottom edges of the artwork, and along the top and bottom edges of the lettering. Along these lines the summation of values is at a maximum, due to the large number of "1"s contributed by the edges. In FIG. 4 this is represented by dark spots 12. (The spots 12 are at coordinates along the y' axis corresponding to the principal edges of the artwork.)

Figure 5A:
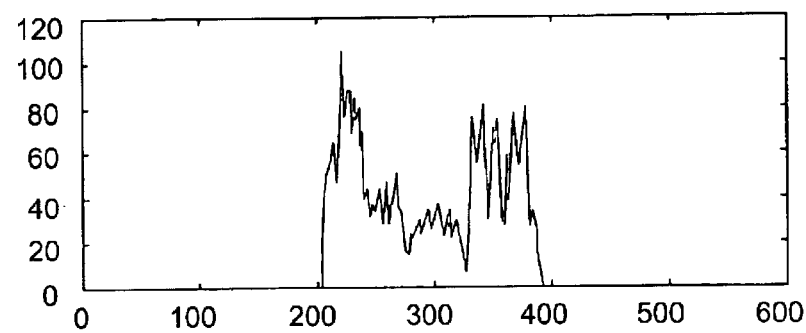
FIGS. 5A–5C are individual Radon function plots for certain angles in FIG. 4.
Figure 5B:
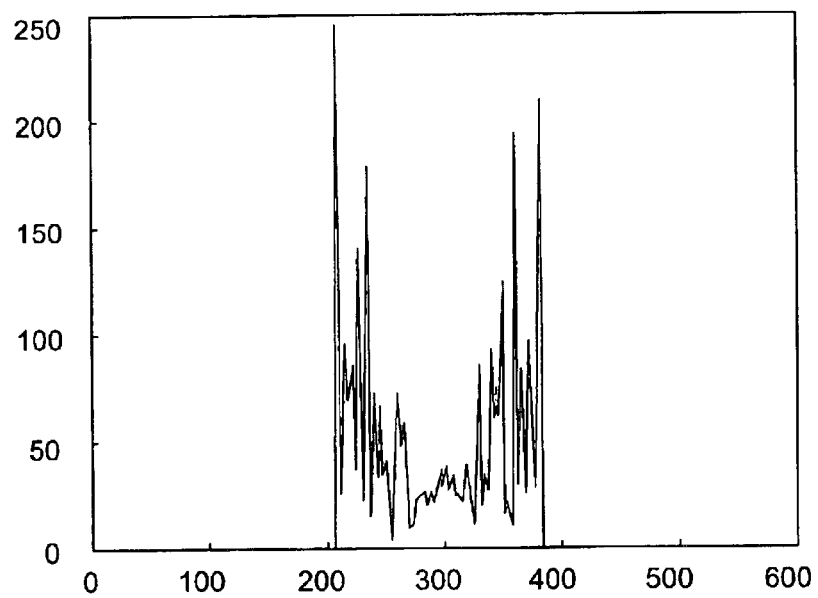
Figure 5C:
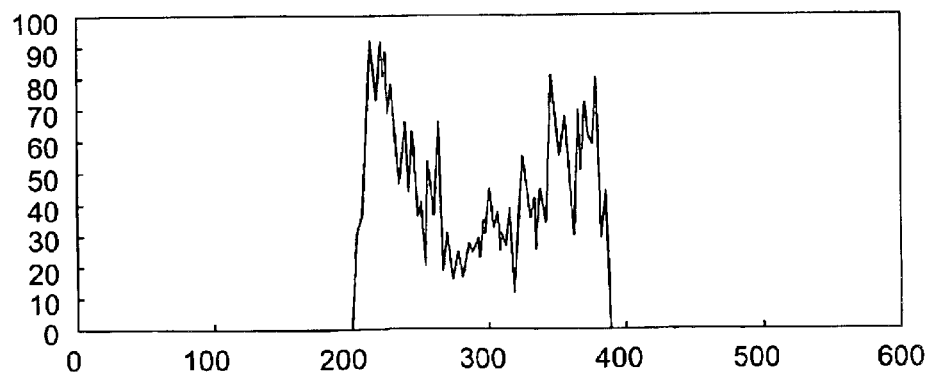

FIGS. 5A, 5B, and 5C show slices of the FIG. 4 figure taken at angles theta of 70, 72 and 74 degrees. The peaks in the component Radon function of FIG. 5B correspond to the dark spots 12 of FIG. 4.

(In the FIG. 4 diagram, the dark spots correspond to the portion in the graph where the composite graphed Radon functions reach a narrow "neck." This is not happenstance in the case of the illustrative document; the Radon trapezoid has its narrowest dimension when the angle theta is parallel to the long axis of the document. In such case the projection of the narrow dimension of the document along the axis x' is the narrowest.)

It will be noted that the document of FIG. 2 has another series of straight lines corresponding to the left and right side edges of the artwork. These, too, are reflected in the Radon functions of FIG. 4 at spots 14, but are much lower in magnitude than the dark spots 12 caused by the top and bottom edge lines.

Once the spots 12 are located, e.g., by a thresholding operation, the document rotation is known.

The remaining 180 degree ambiguity can be resolved through other tests, such as trial watermark decoding at each of the two orientations to determine which orientation produces valid data, e.g., by reference to error correction codes in the watermark payload data, or by detection of known bits in the payload. (The 90 degree ambiguity that may arise from the presence of both vertical and horizontal edges can be similarly resolved.)

If desired, the document rotation can first be determined in gross steps, e.g., by computing the Radon function with angular increments of 2 degrees (and optionally with relatively course sample spacings along the x' axis). Once a gross rotation state is determined, the process can be repeated with smaller angular increments spanning a limited range, e.g., 70–74 degrees, (and optionally with relatively finer sample spacings along the x' axis).

To summarize, the foregoing determination of document rotation relies on the presence of horizontal and vertical edges in the document image that are parallel (or at a known angle) to the watermark encoding axes. The Radon function is used to identify the orientation of these edges, thereby providing rotation data that can be used either (1) to counter-rotate the image data back to its original state for watermark decoding, or (2) to define the inclination of the axes along which watermark decoding should proceed.

Many documents, other than banknotes, have the preponderance of vertical and horizontal lines on which the foregoing Radon-based determination of rotation is based. Others, however, do not. Passport photos are an example of the latter. To determine the rotation of such documents, it is desirable to add one or more lines (or graticules) by which the watermarking axis (axes) can be discerned. Such a feature can easily be added to many documents for this purpose. In addition to permitting determination of rotation, such a designed-in feature also permits determination of scaling (i.e., if a one inch line in an original document is scanned and found to be 1.5 inches long, the scaling factor in at least that dimension is known to be 150%). Likewise, knowing the line's starting point in the original document, and the line's starting point in the scanned data, permits determination of x- and y-translation of the image.

Differential Scaling

In U.S. Pat. No. 5,862,260 (and in the cited pending application), the present assignee disclosed the use of a subliminal graticule signal (sometimes termed a "grid" signal) in the frequency domain by which the geometrical transformation of an image might be determined. The patent shows, in FIG. 29A, an illustrative combination of impulse signals that may comprise such a grid signal. When an image bearing such a signal is geometrically transformed in the pixel domain, those frequency domain impulses move in predictable ways, permitting the particular transformation to be quantified.

In the '260 patent, the geometrical transformations sought to be quantified were rotation, scale, and translation; differential scaling was ignored.

By the earlier-described procedure, rotation can be discerned independently of the grid signal. With this parameter known, the transformation data represented by the shifted impulses of the grid signal can be analyzed to determine a different unknown: differential scaling.

Figure 6:
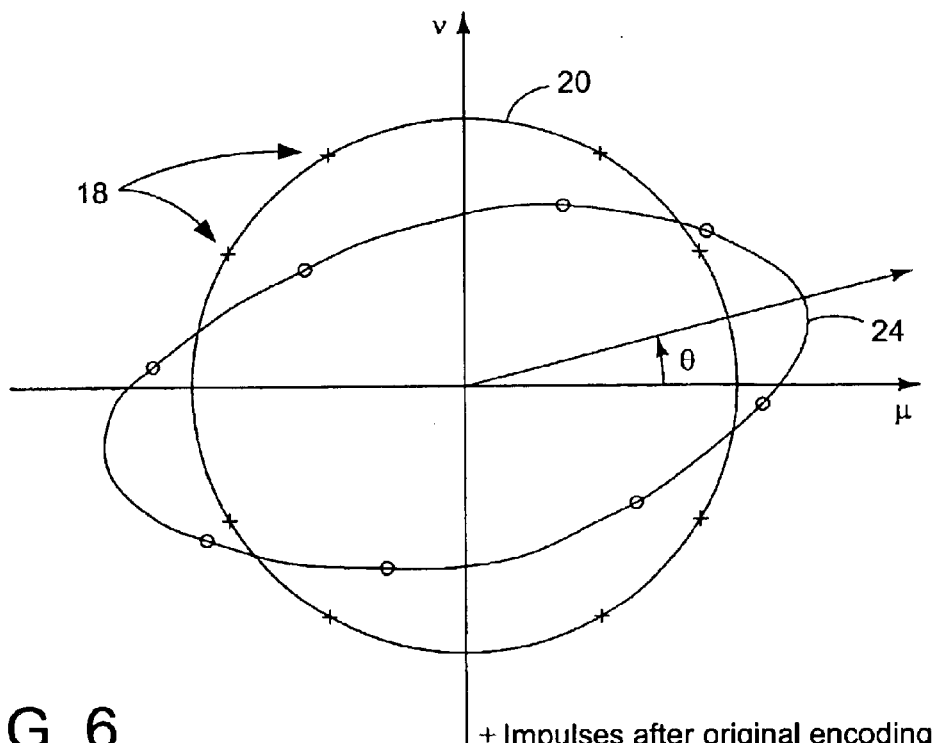
FIG. 6 is a frequency domain representation of a grid signal in an original, and in a differentially-scaled image.

For purposes of illustration, the following discussion proceeds with reference to the grid signal shown by the frequency domain plot of FIG. 6. The grid pattern 18 of impulses that comprise this signal are equally spaced about a circle 20 of fixed radius. (Such a signal is not generally utilized, but illustrates—more clearly than FIG. 29A of the '260 patent—the geometrical principles employed in the below-detailed methodology.)

Referring to FIG. 6, it will be recognized that scaling of the image in the pixel domain will cause the grid signal impulses to move towards or away from the origin in the frequency domain. If the scaling in x is the same as the scaling in y, the points in grid pattern 18 will move equal radial distances away from the origin; the circle will simply expand or contract.

If, however, the scaling in x is different than that in y, these impulses will move differently in the u and v dimensions, transforming the circular pattern of points 18 into an elliptical pattern of points 24.

Figure 7:
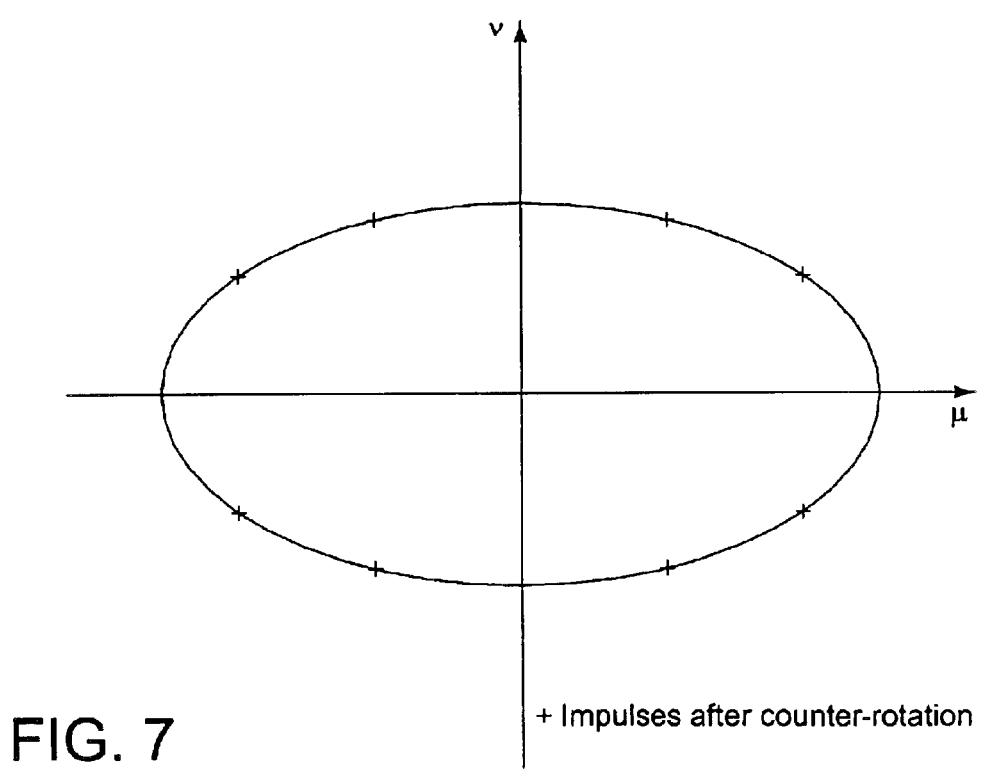
FIG. 7 shows the differentially-scaled grid signal of FIG. 6 after counter-rotation to compensate for known rotation.

To determine the differential scaling, the elliptical pattern 24 of FIG. 6 is first counter-rotated to remove the rotation discerned by the earlier-detailed procedure, yielding the rotationally-compensated ellipse of points shown in FIG. 7. These points are then analyzed to determine the u and v scaling factors at which the cross-correlation between the FIG. 7 points and those of the original FIG. 6 points 18 peaks (e.g., by use of a generalized matching function implemented by a matched filter).

It will be recognized that in the foregoing steps, the presence of the image data appears as noise amidst the impulses of the grid signal, so the matched filter output does not yield a single, clean, correlation signal. Rather, the correlation output will have a significant noise component. The filter output corresponding to the correct u and v scaling factors should produce a peak above the noise but, depending on image characteristics, there may be several such peaks that appear as candidates for the correct u and v scaling factors.

In one embodiment, the u and v scaling factors that result in the ten highest correlation outputs are identified as candidates for the correct scaling factors. (Only those above a threshold value are considered; if none rises to this level, the image may be assumed not to have a grid signal.) Each of these candidate u and v scaling factors is then applied to the frequency-domain representation of the input image (which is also compensated to remove the earlier-determined rotation) so as to restore same to a possibly-original state. Each of these thus-compensated frequency domain image representations is then correlated against the original frequency domain grid pattern 18 to identify which of the ten candidates yields the best correlation. (Simple multiply-and-sum correlation can be used since there are a relatively few points in the pattern 18.)

By the foregoing procedure, the scaling factors in u and v are determined. The scaling factors in x and y are identical.

Once the scaling factors are known, together with the rotation state, the frequency domain representation of the input image data can be compensated to correct for such distortions. The thus-corrected data can be transformed to the spatial domain to yield an image (the intermediate image) that corresponds—in x and y scale, and in rotation—to the image originally encoded.

To complete restoration of the intermediate image back to the original state, all that remains is to determine, and compensate for, translation in x and y. This can readily be accomplished by correlating the intermediate image (in the pixel domain), with the pixel domain counterpart to the grid signal. Again, generalized matched filter techniques can be used. Once the x and y translation has thereby been determined, the intermediate image can be shifted by a like amount to yield a final image that is matched—in rotation, translation, and differential scale—to the original image, and thus ready for watermark decoding.

(Alternatively, as noted before, the non-compensated image can be decoded in its distorted state. In such case, the rotation, scaling, and offset factors as determined above are used as decoding parameters, e.g., defining (1) the axis along which decoding should proceed, (2) the watermark origin, and (3) the spacing of the regions in the distorted image that correspond to the original pixels. In still other embodiments, some distortion factors can be compensated for in the distorted image, and others used to define decoding parameters.)

Concluding Comments

As is familiar to those skilled in the arts, the foregoing methods may be performed using dedicated hardware, through use of a processor programmed in accordance with firmware or software, etc. In the latter case the processor may include a CPU and associated memory, together with appropriate input and output devices/facilities. The software can be resident on a physical storage medium such as a disk, and can be loaded into the processor's memory for execution. The software includes instructions causing the CPU to perform the various processes detailed above.

To provide a comprehensive disclosure without unduly lengthening this specification, applicant incorporates by reference the patents and applications cited above.

Having described an illustrated the principles of my invention with reference to specific embodiments, it will be recognized that the principles thereof can be implemented in many other, different, forms. For example, while the rotation-determination method was particularly illustrated with reference to the Radon transformation, many other techniques for locating lines in an image can alternatively be used. One such alternative is the Hough transform.

Moreover, the particular combinations of elements and features in the above-detailed embodiments are exemplary only; the interchanging and substitution of these teachings with other teachings in this and the incorporated-by-reference patents/applications are also contemplated.

I claim:

1. A method of watermark decoding that includes:
   providing a set of input image data;
   applying an edge detection algorithm to the image data to yield a processed image;
   sensing linear energy in the processed image along more than two different angles;
   identifying an angle yielding an extrema of energy; and
   decoding a watermark from the input image data by reference to said angle.

2. The method of claim 1 in which the extrema is a maxima.

3. The method of claim 1 that includes virtually rotating the input image data by said angle.

4. A method of decoding a watermark from an image, including:
   providing a set of data representing the image in the frequency domain;
   compensating said set of data for a rotation factor;
   correlating said compensated set of data with a reference signal; and
   determining, based on said correlation, differential scaling of said image; and
   by reference to said determined differential scaling, decoding a watermark from the image.

5. The method of claim 1 wherein said decoding yields a plural bit digital data payload conveyed by the watermark.

6. The method of claim 4 wherein said decoding yields a plural bit digital data payload conveyed by the watermark.

* * * * *